Dec. 20, 1955

D. J. SIKORRA 2,728,071

STABILITY RESERVE INDICATOR FOR SYNCHRONOUS
DYNAMOELECTRIC MACHINES

Filed Feb. 19, 1951

Inventor
Daniel J. Sikorra
by Walter J. Madden Jr.
Attorney

United States Patent Office 2,728,071
Patented Dec. 20, 1955

2,728,071

STABILITY RESERVE INDICATOR FOR SYNCHRONOUS DYNAMOELECTRIC MACHINES

Daniel J. Sikorra, Milwaukee, Wis., assignor to Allis-Chalmers Manufacturing Company, Milwaukee, Wis.

Application February 19, 1951, Serial No. 211,724

9 Claims. (Cl. 340—253)

This invention relates in general to electric indicating devices and in particular to means for indicating the steady state stability reserve of synchronous dynamoelectric machines.

In the operation of synchronous generators, it is desirable that some indication be available at all times as to the synchronous steady state stability reserve of the generator. This is especially true for generators which are not equipped with automatic voltage regulators and in which the excitation of the generator is adjusted by attending personnel in response to variations in the operating condition of the generator. Such indication should inform the operator when the generator is approaching the point of loss of synchronism and should also preferably enable the operator to readily determine the amount of additional load which may be placed on the generator without causing synchronous pullout.

It is possible to obtain the difference between two electric quantities whose relation is a stability reserve indication, such as machine watts and excitation, and utilize the resulting difference as an indication of the stability reserve of the synchronous machine. However, such a system would have the disadvantage that, since it is the ratio between machine watts and excitation rather than the difference between the quantities that is the stability reserve indication, the stability reserve indication obtained therefrom would be accurate for only the one loading of the generator at which the ratio between the quantities and the difference therebetween produce the same effect on the indicating means.

This disadvantage can be overcome by utilizing indicating means which are actuable in response to the ratio between the quantities whose ratio is an indication of machine stability, so that the system operates to accurately indicate stability reserve for various operating conditions of the machine.

It is therefore an object of this invention to provide a system for indicating the stability reserve of a synchronous dynamoelectric machine.

It is an additional object of the present invention to provide a system for indicating the stability reserve of a synchronous dynamoelectric machine which is independent of the operating conditions of the machine.

It is a further object of this invention to provide a system for indicating the stability reserve of a synchronous dynamoelectric machine which permits ready determination of the capacity of the machine to carry additional load.

Figure 1:
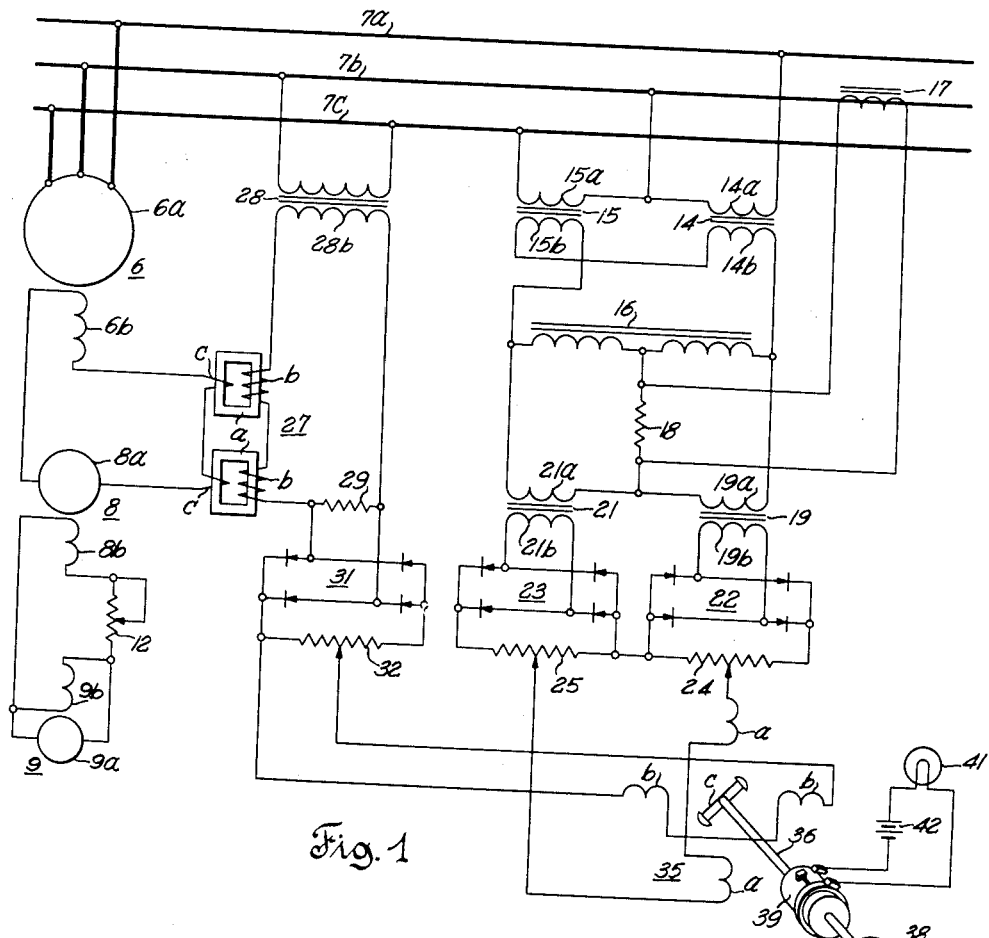

Referring to Fig. 1, one embodiment of the invention is illustrated in connection with the control of a synchronous dynamoelectric machine 6, such as an generator having an armature 6a supplying a load circuit represented by conductors 7a, 7b, 7c. Machine 6 is provided with a field winding 6b supplied with excitation from any suitable controllable source such as the armature 8a of an exciter generator 8. Generator 8 is in turn provided with a field winding 8b energized from the armature 9a of a pilot exciter 9 in series with an adjustable resistor 12. Exciter 9 is provided with a field winding 9b connected across armature 9a to produce across armature 9a a substantially constant voltage, so that the energization of field winding 6b may be varied by adjustment of resistor 12.

A measure of the stability of machine 6 may be obtained in any suitable manner, such as by obtaining the ratio between the watt output of machine 6 and the excitation of winding 6b or by comparing the reactive component of current supplied by machine 6 with a suitable reference. However, since the ratio of the in-phase component of current supplied by machine 6 to the excitation of field winding 6b is substantially constant for a given stability reserve and is independent of the machine voltage, this last named ratio is preferably utilized.

A measure of the in-phase current component supplied by machine 6 may be obtained by means including transformers 14, 15 having primary phase windings 14a, 15a connected to load conductors 7 and provided with secondary phase windings 14b, 15b. The ratio between the turns of the primary and secondary windings of transformers 14, 15 may be of any suitable value, in accordance with the value of the voltage of conductors 7.

An autotransformer 16 has its terminals connected to the noncommon terminals of the secondary windings 14b, 15b to produce across autotransformer 16 a voltage which is the resultant of the voltages of the two interconnected secondary windings 14b, 15b and which is in phase with the phase voltage of conductor 7b. A current transformer 17, placed in series with the load conductor 7b, produces across any suitable impedance means a voltage which is a measure of the current in load conductor 7b. Depending upon the connections of windings 14b, 15b the impedance means may be a resistor or a reactive device (inductive reactor or capacitor). When the secondary phase windings 14b, 15b are connected as shown, the impedance means consist of a resistor 18 so that the voltage of resistor 18 is in phase with the voltage of autotransformer 16 when the output of machine 6 is at unity power factor.

Resistor 18 has one of its terminals connected to a center tap on autotransformer 16 and the other of its terminals connected to the common terminal of the primary windings 19a, 21a of two transformers 19, 21, provided with secondary windings 19b, 21b. The terminals of autotransformer 16 are connected to the noncommon terminals of primary windings 19a, 21a. The voltage of secondary winding 19b will therefore be equal to the vectorial sum of the voltage of resistor 18 and one-half of the voltage of autotransformer 16, and the voltage of secondary winding 21b will be equal to the vectorial difference between one-half of the voltage of autotransformer 16 and the voltage of resistor 18. Secondary winding 19b is connected to the alternating current terminals of any suitable known full wave rectifier 22, and winding 21b is connected to the alternating current terminals of a similar full wave rectifier 23. Voltage divider 24 is connected to the direct current terminals of rectifier 22 and a similar voltage divider 25 is connected to the direct current terminals of rectifier 23.

Figure 2:
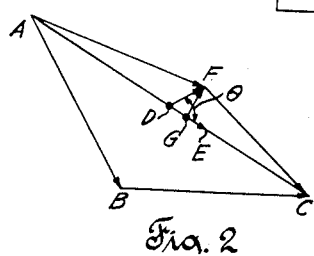

Fig. 2 shows the relation between the voltage vectors of the circuits of the stability reserve indicating system described thus far. Vector AB represents the voltage of secondary winding 14b and vector BC represents the voltage of secondary winding 15b. Vector AC is the resultant of vector AB and BC and represents the voltage of autotransformer 16, since autotransformer 16 is connected across the noncommon terminals of windings 14b, 15b. Point D on voltage vector AC represents the center tap of autotransformer 16 to which one terminal of resistor 18 is connected.

The voltage of resistor 18, which is a measure of the current in conductor 7b of the load circuit, is represented by vector DE in phase with the voltage vector AC when the output of machine 6 is at unity power factor. The voltage of resistor 18 is represented by another vector DF when the current in the load circuit leads the output voltage of machine 6 by an angle θ. Owing to the connection of autotransformer 16, resistor 18 and windings 19a, 21a, at unity power factor in the output circuit of machine 6, the voltage of transformer secondary winding 19b is represented by the vector AE and the voltage of secondary winding 21b is represented by the vector EC. Since rectifiers 22, 23 are connected to secondary windings 19b, 21b, respectively, it will be apparent that the difference between the voltages of rectifiers 22, 23 at unity power factor will be a voltage equal to twice the voltage of resistor 18.

At a power factor angle of θ in the output circuit of machine 6, the voltage of rectifier 22 may be represented by vector AF and the voltage of rectifier 23 by vector FC. The component of voltage DF which is in phase with the voltage AC may be obtained by projecting vector DF at DG on vector AC. By making voltage AC large compared with voltage DF, the difference between voltages AF and FC will be substantially equal to the difference between voltages AG and GC, which difference is directly proportional to the component of current in the load circuit in phase with the voltage of the load circuit.

The voltage of rectifier 22 will therefore exceed the voltage of rectifier 23 by an amount proportional to the in-phase component of the current supplied by machine 6 to the load circuit, and this voltage difference may be utilized as a measure of a characteristic of the current in the load circuit. Transformers 14, 15, autotransformer 16 and resistor 18 therefore constitute means for producing a voltage which is a measure of a characteristic of the load current and rectifiers 22, 23 constitute rectifier means energized by a voltage proportional to the in-phase component of the current supplied by machine 6 to the load conductors. It will be seen that the voltage proportional to the in-phase component of current is independent of variations in the output voltage of machine 6, since this latter voltage effectively cancels itself owing to the connection of rectifiers 22, 23. It will be apparent that other suitable impedance means, such as a reactor, could be used in lieu of resistor 18 to preserve the desired voltage relations in the circuits if the connections of one of the windings 14b, 15b are reversed.

Suitable means are provided to produce a voltage which is a measure of the excitation of field winding 6b of machine 6. Such means may consist of a voltage divider, or a saturable reactor 27 having a pair of magnetic cores 27a, a reactance winding 27b and a control winding 27c. The voltage divider or the control winding 27c may be connected in series with exciter 8 and field winding 6b to be thereby traversed by the current in field winding 6b. Although the voltage divider or winding 27c may also be connected in parallel with field winding 6b, the series connection is preferable as the measure of excitation obtained thereby is independent of variations in the resistance of field winding 6b resulting from temperature variations. The control winding may comprise a variable number of turns depending upon the maximum current intensity in the field winding 6b, and if the currents in field winding 6b are large, the control winding may consist of a straight section of bus bar penetrating through the window of the associated reactor core. Reactance winding 27b is energized from any suitable alternating current source such as the secondary winding 28b of a transformer 28 in series with a resistor 29. Resistor 29 is connected to the alternating current terminals of a suitable full wave rectifier 31 having an adjustable voltage divider 32 connected across the direct current terminals thereof.

Variations in the current through control winding 27c operate in a well known manner to produce variations in the reactance of winding 27b and thereby vary the voltage supplied to resistor 29 and rectifier 31. Reactor 27 therefore constitutes variable impedance means connected to the field winding means of machine 6 for producing across divider 32 a voltage which is a measure of the excitation of machine 6.

The above described stability reserve determining voltages are impressed upon suitable differentially responsive means such as a ratio measuring telemetric receiver 35. Receiver 35 is provided with a first pair of field coils 35a and a second pair of field coils 35b mechanically displaced 90 degrees from coils 35a. Receiver 35 is also provided with a rotor member 35c comprising a permanent magnet or provided with an energizing winding to provide a pair of magnetic poles alignable with the resultant magnetomotive force of coils 35a, 35b. Rotor 35c is connected through a shaft 36 to an indicating pointer 37 which is movable over a dial 38. Dial 38 is preferably calibrated in terms of percentage of reserve stability. By percentage of reserve stability is meant the additional load, in terms of percentage of the existing load, which may be placed on the machine to reach the point of synchronous pullout without changing the machine excitation. Shaft 36 may also have mounted thereon a contact carrying drum 39 which, upon predetermined movement of shaft 36, complete a circuit between an alarm device such as a lamp 41 and a battery 42.

The voltage proportional to the in-phase component of current supplied by machine 6 to the load circuit is impressed across coils 35a, while the voltage proportional to the excitation of field winding 6b is impressed across coils 35b. Rotor 35c assumes a position determined by the ratio between the currents in coils 35a, 35b and this position is independent of the actual magnitude of the currents through coils 35a, 35b.

In operation of the system, assuming that the predetermined exitation required to produce a given percentage of stability reserve at a given load, as determined by the in-phase current component of machine 6, is known, and that machine 6 is operating with this predetermined excitation and at the given load, dividers 24, 25, 32 are adjusted so that the resultant magnetomotive force of coils 35a, 35b acting on rotor 35c cause pointer 37 to indicate the given percentage of reserve stability on dial 38. If the in-phase component of current supplied by machine 6 increases above the given value while the excitation of winding 6b remains constant, thereby decreasing the percentage of reserve stability of machine 6, the current through coils 35a increases with respect to the current in coils 35b to thereby vary the ratio of the magnetomotive forces of the coils and vary the position of rotor 35c. Rotor 35c thereupon moves pointer 37 on dial 38 to indicate the decreased percentage of reserve stability. If the excitation of winding 6b decreases below the predetermined value while the in-phase current component remains at the given value, thereby decreasing the stability reserve, pointer 37 is similarly actuated by rotor 35c to indicate the decreased stability reserve. If the stability reserve of machine 6 is increased, such as by increasing the excitation of winding 6b or decreasing the in-phase current component supplied by machine 6, this increased reserve stability is similarly indicated on dial 38.

Thus, a station operator may, by reading dial 38, determine the percentage of stability reserve of machine 6 and thereby readily determine the amount of additional load, if any, which may be placed on machine 6 without producing instability. Also, drum 39 may be so mounted on shaft 36 that lamp 41 is lighted when the percentage of stability reserve decreases to an undesired extent.

Figure 3:
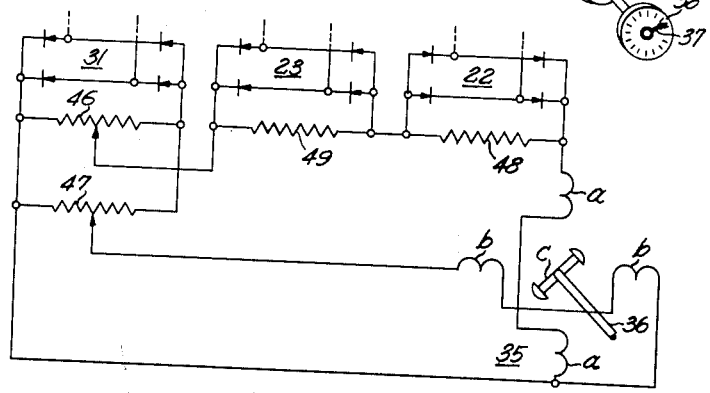

Fig. 3 illustrates an alternate embodiment of the invention in which the direct current terminals of rectifier 31 are connected to a pair of parallel connected voltage dividers 46, 47 to impress thereon a voltage proportional to the excitation of winding 6b. Resistors 48, 49 are connected across the direct current terminals of rectifiers 22, 23, respectively, so that the voltage appearing between the non-common terminals of resistors 48, 49 is proportional to the in-phase current component of machine 6. One terminal of resistor 49 is connected to the adjustable tap of voltage divider 46 to impress across coils 35a a voltage equal to the difference between voltages proportional to the in-phase current component of machine 6 and to the excitation of field winding 6b, respectively. Coils 35b are connected across the adjustable portion of divider 47 to be energized proportionally to the excitation of field winding 6b.

The embodiment of Fig. 3 operates in a manner similar to that described above for Fig. 1 to indicate the reserve stability of machine 6. However, the embodiment of Fig. 3 has the advantage that dial 38 may be provided with a plurality of scales of different calibrations, and by suitable adjustment of the adjustable tap of divider 47 any of the calibrations may be utilized. That is, dial 38 may have one scale representing a considerable range of percentage stability reserve and a plurality of scales of correspondingly reduced percentage ranges, so that any one of the selected scales may be utilized by adjustment of the tap of divider 47.

Although but two embodiments of the present invention have been illustrated and described, it will be apparent to those skilled in the art that various changes and modifications may be made therein without departing from the spirit of the invention or the scope of the appended claims. In particular, although the two illustrated embodiments are utilized in connection with manually controlled synchronous machines, it will be obvious that the invention is equally applicable to machines equipped with automatic control equipment.

It is claimed and desired to secure by Letters Patent:

1. In combination, a synchronous dynamoelectric machine, a load circuit energized by said machine, means connected to said load circuit for producing a first voltage proportional to the in-phase component of current supplied by said machine to said load circuit, means for producing a second voltage proportional to the excitation of said machine, the ratio between said first and second voltages being a measure of the stability reserve of said machine, a telemetric receiver having a first coil and a second coil and a rotor actuable by said coils, means for impressing a voltage proportional to the difference between said first and second voltages on said first coil, means for impressing said second voltage on said second coil, a dial provided with a plurality of different scales of percentage of stability reserve of said machine, and an indicator connected to said rotor and movable over said dial for indicating the percentage of stability reserve of said machine.

2. In combination, a synchronous dynamoelectric machine, a load circuit energized by said machine, means connected to said load circuit for producing a first voltage proportional to the in-phase component of current supplied by said machine to said load circuit, means for producing a second voltage proportional to the excitation of said machine, the ratio between said first and second voltages being a measure of the stability reserve of said machine, a telemetric receiver having a first coil and a second coil and a rotor actuable by said coils, means for impressing a third voltage proportional to the difference between said first and said second voltages on said first coil, means for adjusting the magnitude of said third voltage, means for impressing said second voltage on said second coil, a dial provided with a plurality of different scales of percentage of stability reserve of said machine, and an indicator connected to said rotor and movable over said dial for indicating the percentage of stability reserve of said machine.

3. In combination, a synchronous dynamoelectric machine, a load circuit energized by said machine, means connected to said load circuit for producing a first voltage proportional to only the in-phase component of current supplied by said machine to said load circuit, means for producing a second voltage proportional to the excitation of said machine, the ratio between said first and second voltages being a measure of the stability reserve of said machine, a telemetric receiver having a first coil and a second coil and a rotor actuable by said coils, means for impressing a voltage proportional to the difference between said first and second voltages on said first coil, means for impressing said second voltage on said second coil, a dial provided with a scale of percentage of stability reserve of said machine, and an indicator connected to said rotor and movable over said dial for indicating the percentage of stability reserve of said machine.

4. In combination, a synchronous dynamoelectric machine, a load circuit energized by said machine, means connected to said load circuit for producing a first voltage proportional to only the in-phase component of current supplied by said machine to said load circuit, means for producing a second voltage proportional to the excitation of said machine, the ratio between said first and second voltages being a measure of the stability reserve of said machine, a telemetric receiver having a first coil and a second coil and a rotor actuable by said coils, means for impressing a third voltage proportional to the difference between said first and said second voltages on said first coil, means for adjusting the magnitude of said third voltage, means for impressing said second voltage on said second coil, a dial provided with a scale of percentage of stability reserve of said machine, and an indicator connected to said rotor and movable over said dial for indicating the percentage of stability reserve of said machine.

5. In combination, a synchronous dynamoelectric machine, a load circuit connected to said machine, means responsive solely to the in-phase component of the current supplied by said machine to said load circuit for producing a first voltage, means for producing a second voltage proportional to the excitation of said machine, a ratiometer, and means impressing said voltages on said ratiometer for causing said ratiometer to indicate the ratio of said voltages as a measure of the stability of said machine.

6. In combination, a synchronous dynamoelectric machine having a variable excitation and a variable output characteristic, a load circuit connected to said machine, means responsive to said variable output characteristic of said machine for producing a first variable voltage, means for producing a second variable voltage proportional to said variable excitation of said machine, a ratiometer, and means impressing said variable voltages on said ratiometer, said ratiometer responding solely to the ratio of said variable voltages to indicate the ratio of said variable voltages as a measure of the stability of said machine.

7. In combination, a synchronous dynamoelectric machine, a load circuit connected to said machine, means responsive solely to the in-phase component of the current supplied by said machine to said load circuit for producing a first voltage, means for producing a second voltage proportional to the excitation of said machine, a ratiometer, and means impressing said voltages on said ratiometer for causing said ratiometer to respond solely to the ratio of said voltages to cause said ratiometer to indicate the ratio of said voltages as a measure of the stability of said machine.

8. In combination, a synchronous dynamoelectric machine having a variable excitation and a variable output characteristic; a load circuit connected to said machine; means responsive to said variable output characteristic of said machine for producing a first variable voltage; means for producing a second variable voltage proportional to said variable excitation of said machine; a ratiometer having a first coil, a second coil, and an indicating rotor; and means impressing said first variable voltage on said first coil and said second variable voltage on said second coil, said rotor responding solely to the ratio of said variable voltages to indicate the ratio of said voltages as a measure of the stability of said machine.

9. In combination, a synchronous dynamoelectric machine; a load circuit connected to said machine; means responsive solely to the in-phase component of the current supplied by said machine to said load circuit for producing a first voltage proportional to said component; means for producing a second voltage proportional to the excitation of said machine; a ratiometer having a first coil, a second coil mechanically displaced ninety degrees from said first coil, and an indicating rotor alignable with the resultant magnetomotive force of said coils for positioning said rotor in response solely to the ratio of the voltage on said first coil to the voltage on said second coil; and means impressing said first voltage on only said first coil and said second voltage on only said second coil for causing said rotor to indicate the ratio of said voltages as a measure of the stability of said machine.

References Cited in the file of this patent

UNITED STATES PATENTS

| | | |
|---|---|---|
| 1,004,420 | Haagn | Sept. 26, 1911 |
| 1,328,465 | Treat | Jan. 20, 1920 |
| 2,071,855 | Schaelchlin | Feb. 23, 1937 |
| 2,150,302 | Tubbs | Mar. 14, 1939 |

FOREIGN PATENTS

| | | |
|---|---|---|
| 646,255 | Great Britain | Nov. 15, 1950 |